(12) United States Patent
Mahaffy

(10) Patent No.: US 12,731,937 B2
(45) Date of Patent: Sep. 8, 2026

(54) SYSTEMS, METHODS, AND DEVICES FOR LOCKING A CONNECTOR OF A BATTERY

(71) Applicant: Toyota Motor Engineering & Manufacturing North America, Inc., Plano, TX (US)

(72) Inventor: Matthew J. Mahaffy, Tipton, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA (JP)

( * ) Notice: Subject to any disclaimer, the term of this patent is extended or adjusted under 35 U.S.C. 154(b) by 330 days.

(21) Appl. No.: 18/436,789

(22) Filed: Feb. 8, 2024

(65) Prior Publication Data

US 2025/0260190 A1 Aug. 14, 2025

(51) Int. Cl.
*H01R 13/502* (2006.01)
*B60L 50/60* (2019.01)
*B60R 16/033* (2006.01)
*H01R 13/639* (2006.01)

(52) U.S. Cl.
CPC ......... *H01R 13/502* (2013.01); *H01R 13/639* (2013.01); *B60L 50/60* (2019.02); *B60R 16/033* (2013.01); *H01R 2201/26* (2013.01)

(58) Field of Classification Search
CPC ............... H01R 13/502; H01R 13/639; H01R 2201/26; H01R 13/6397; H01R 13/44; H01R 13/713; B60L 53/16
See application file for complete search history.

(56) References Cited

U.S. PATENT DOCUMENTS

| | | | | |
|---|---|---|---|---|
| 7,125,268 | B1 * | 10/2006 | Marukawa | B60L 3/04 439/133 |
| 9,160,127 | B2 * | 10/2015 | Rule-Greet | B60L 53/16 |
| 9,362,654 | B2 | 6/2016 | Gonzales et al. | |
| 9,929,508 | B2 | 3/2018 | Puhl et al. | |
| 10,003,157 | B2 | 6/2018 | Yeon | |
| 10,404,012 | B1 | 9/2019 | Stoyanov | |
| 10,511,005 | B2 | 12/2019 | Lee et al. | |
| 10,559,933 | B1 | 2/2020 | Menzies et al. | |
| 10,955,487 | B2 | 3/2021 | Hemnani et al. | |
| 11,325,481 | B2 | 5/2022 | Collins | |
| 11,712,976 | B2 | 8/2023 | Perkins | |
| 12,034,244 | B2 * | 7/2024 | Enger | H01R 13/44 |
| 2023/0018864 | A1 * | 1/2023 | Perkins | H01R 13/44 |

* cited by examiner

*Primary Examiner* — Edwin A. Leon
(74) *Attorney, Agent, or Firm* — Snell & Wilmer LLP

(57) ABSTRACT

Methods, systems, and devices for a lock out device for locking a battery connector. The lock out device may include a plug having a plug end configured to engage the battery connector to prevent another connector from being connected to the battery connector. The plug may further include a lock end opposite of the plug end defining a length of the plug, the lock end having a first ring configured to receive a lock shackle. The lock out device may further include a sliding device movably coupled to the plug and having a second ring configured to receive the lock shackle. The sliding device may be configured to rotate about an axis perpendicular to the length of the plug and to slide in a direction perpendicular to the length of the plug to prevent the plug from being removed from the battery connector.

20 Claims, 9 Drawing Sheets

SYSTEMS, METHODS, AND DEVICES FOR LOCKING A CONNECTOR OF A BATTERY

BACKGROUND

1. Field

The present disclosure relates to a system, method, and/or device for locking a connector of a battery and, more particularly, for locking a connector of a battery of a hybrid electric vehicle (HEV) and/or an electric vehicle (EV).

2. Description of the Related Art

When an HEV and/or an EV battery is being stored before installation in a vehicle, and/or while the vehicle is being serviced or repaired such that the battery is unplugged from the vehicle, a high voltage connector of the battery may present an electrical hazard. To mitigate the electrical hazard, existing devices and/or methods include placing red tape over the high voltage connector or placing a dummy connector (or safety plug) into the high voltage connector while the battery is being stored and/or the vehicle is being serviced or repaired. However, with either of the existing methods, any individual can remove the red tape and/or the dummy connector prematurely thereby presenting the electrical hazard.

Accordingly, it is desirable to provide systems, methods, and devices for locking a connector of a battery of an HEV and/or an EV.

SUMMARY

In general, one aspect of the subject matter described in this disclosure may be embodied in a lock out device for locking a battery connector. The lock out device may include a plug having a plug end configured to engage the battery connector to prevent another connector from being connected to the battery connector. The plug may further include a lock end opposite of the plug end defining a length of the plug, the lock end having a first ring configured to receive a lock shackle. The lock out device may further include a sliding device movably coupled to the plug and having a second ring configured to receive the lock shackle. The sliding device may be configured to rotate about an axis perpendicular to the length of the plug and to slide in a direction perpendicular to the length of the plug to prevent the plug from being removed from the battery connector.

In another aspect, the subject matter may be embodied in a lock out device for locking a connector of a vehicle battery. The lock out device may include a plug configured to engage the connector of the vehicle battery to prevent another connector from being connected to the connector of the vehicle battery. The plug may include a first ring configured to receive a shackle of a lock. The plug may further include a left side protrusion. The plug may further include a right side protrusion opposite of the left side protrusion defining a width of the plug. The lock out device may further include a sliding device movably coupled to the plug and having a second ring configured to receive the shackle. The sliding device may be configured to rotate about the left side protrusion and the right side protrusion and to slide toward the plug to align the first ring and the second ring such that the first ring and the second ring may receive the shackle to prevent the plug from being removed from the connector of the vehicle battery.

BRIEF DESCRIPTION OF THE DRAWINGS

Other systems, methods, features, and advantages of the present disclosure will be apparent to one skilled in the art upon examination of the following figures and detailed description. Component parts shown in the drawings are not necessarily to scale and may be exaggerated to better illustrate the important features of the present disclosure. In the drawings, like reference numerals designate like parts throughout the different views.

DETAILED DESCRIPTION

Disclosed herein are systems, methods, devices, and/or vehicles for implementing a battery lock out device for locking a connector of a battery. Particular embodiments of the subject matter described in this disclosure may be implemented to realize one or more of the following advantages. The battery lock out device may control power flow from a battery when the battery contains a level of charge and is being stored before installation into a vehicle and/or when the vehicle is being serviced, repaired, or anytime the electrical hazard of the battery must be minimized. The battery lock out device controls the power flow from the battery and renders the battery effectively inert by locking a disconnected connector of the battery with a physical lock such that the battery connector cannot be plugged into the vehicle. This prevents an individual from plugging the battery into the vehicle and energizing various systems of the vehicle prematurely and when it would not be safe to do so (e.g., when the vehicle is not done being serviced and mechanics must still handle vehicle components that are energized when the battery is plugged in).

Moreover, because the battery lock out device enables the battery connector to be locked with the physical lock, it is possible to control an amount of individuals who possess (or have access to) a key that can unlock the physical lock thereby improving the safety of hybrid electric vehicle (HEV) and/or electric vehicle (EV) manufacturing, servicing, and/or repair. Thus, an individual who has the training to know when it is safe to plug the battery into the vehicle may possess the key and control when the battery is plugged in.

Figure 1:
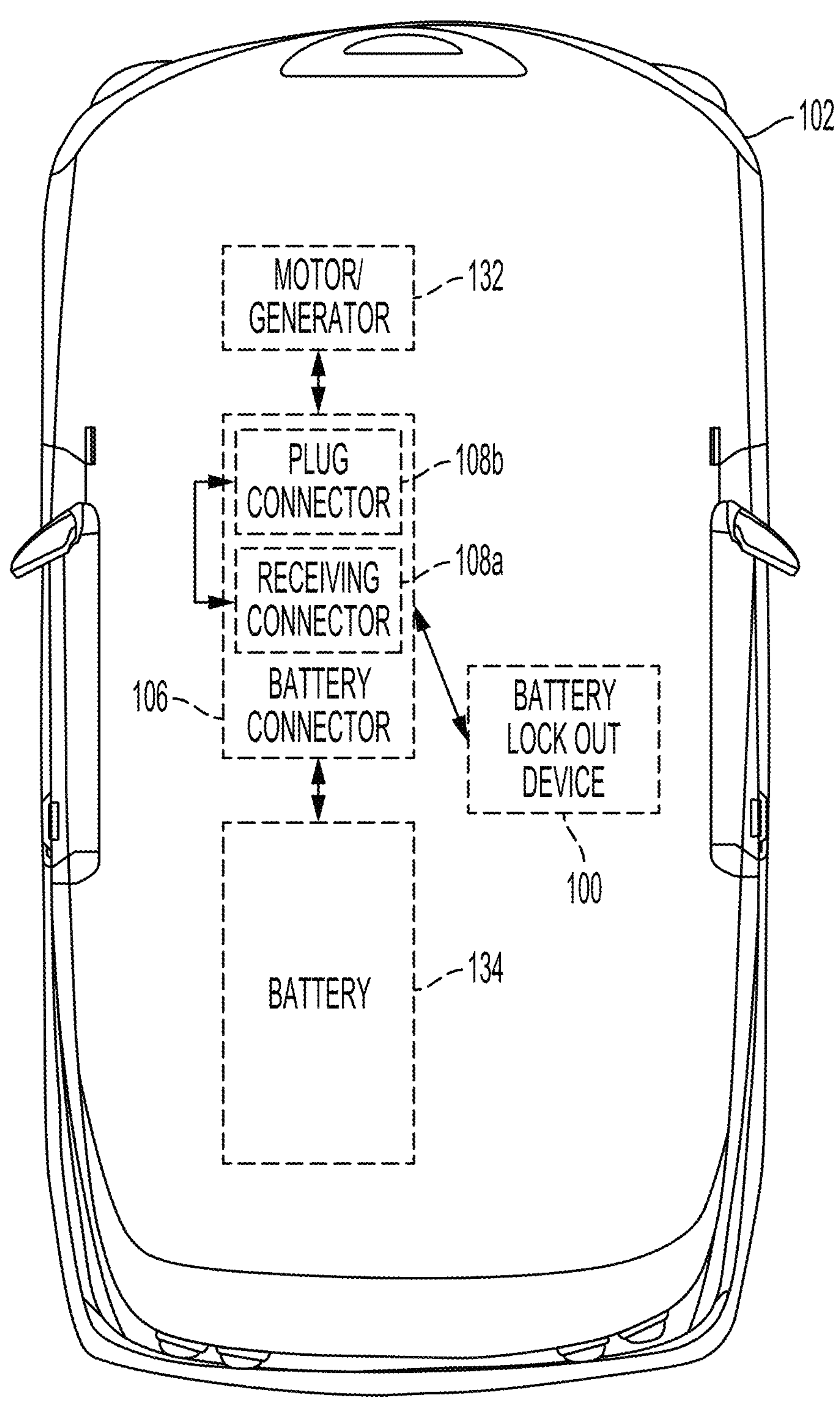
FIG. 1 is a schematic of an example vehicle with which an example battery lock out device may be implemented according to an aspect of the disclosure.

FIG. 1 illustrates an example vehicle 102 in which an example battery (or connector or battery connector) lock out device 100 may be implemented. The battery lock out device 100 may be retro-fitted, coupled to, include or be included within the vehicle 102 or separate from the vehicle 102. The vehicle 102 may be a conveyance capable of transporting a person, an object, or a permanently or temporarily affixed apparatus. The vehicle 102 may be a self-propelled wheeled conveyance, such as a car, a sports utility vehicle, a truck, a bus, a van or other motor, battery or fuel cell driven vehicle. For example, the vehicle 102 may be an EV, a HEV, a hydrogen fuel cell vehicle, a plug-in hybrid vehicle or any other type of vehicle that has a battery, a motor, an engine, and/or a generator. Other examples of vehicles include bicycles, trains, planes, or boats, and any other form of conveyance that is capable of transportation. The vehicle 102 may be semi-autonomous or autonomous. That is, the vehicle 102 may be self-maneuvering and navigate without human input. An autonomous vehicle may have and use one or more sensors and/or a navigation unit to drive autonomously.

The vehicle 102 may include a motor and/or generator 132 and/or a battery 134. The motor and/or generator 132 may be located within an engine bay of the vehicle 102. In examples, the motor and/or generator 132 may be located at and/or adjacent to at least one axel of the vehicle 102 such that the vehicle 102 includes a plurality of motors and/or generators 132. The motor and/or generator 132 may be an internal combustion engine (ICE). In this regard, the motor and/or generator 132 may combust an air and fuel mixture to provide power to the vehicle 102 and/or components of the vehicle 102. Accordingly, the motor and/or generator 132 can cause the vehicle 102 to accelerate, decelerate, or maintain a desired velocity. It should be understood that the motor and/or generator 132 may include combinations of an ICE and an electric motor, such as for HEV applications for example. In examples, the motor and/or generator 132 may be an electric motor. In this regard, the motor and/or generator 132 may be an electric motor and an electric generator that converts electrical energy into mechanical power, such as torque, and converts mechanical power into electrical energy. The motor and/or generator 132 may be electrically connected to the battery 134. The motor and/or generator 132 may convert energy from the battery 134 into mechanical power, and may provide energy back to the battery 134, for example, via regenerative braking.

The battery 134 may be retrofitted, coupled to, include or be included within the vehicle 102 (e.g., a complete HEV and/or EV) or separate from the vehicle 102 (e.g., during manufacturing when the battery 134 is being stored before installation into the vehicle 102). The battery 134 may be electrically connected to the motor and/or generator 132 and/or other components of the vehicle 102 through a battery connector 106. The battery 134 may store chemical energy for later conversion to electrical energy. The battery 134 may provide the electrical energy to and/or receive electrical energy from the motor and/or generator 132 and/or other components of the vehicle 102. The battery 134 may be a battery pack that includes one or more battery modules, a cooling system, and/or a battery management system (BMS). The one or more battery modules may each include one or more cells and a frame to hold and protect the one or more cells. The one or more cells may be cylindrical cells, prismatic cells, and/or pouch cells (in examples, other types of cells may be used). A chemistry of the one or more cells may be lithium ion (Li-Ion), nickel manganese cobalt (NMC), nickel metal hydride (Ni-MH), lithium sulfur (Li—S), and/or lead-acid (in examples, other chemistries may be used).

Figure 5A:
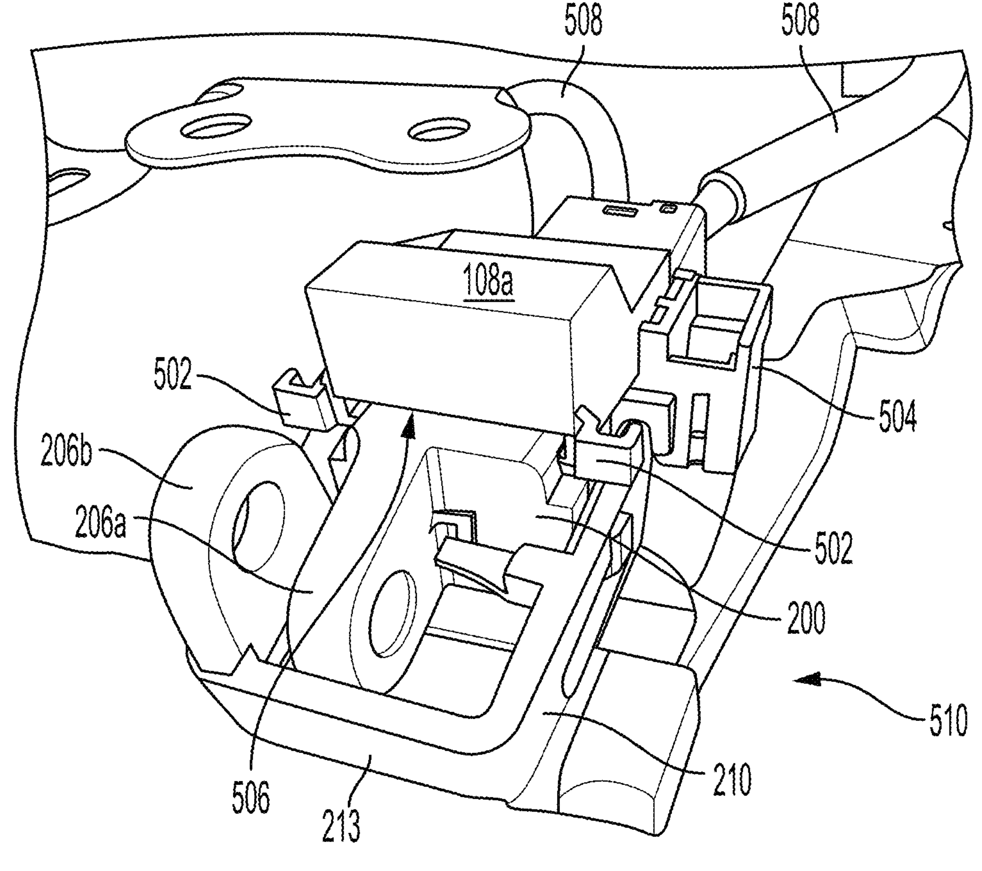
FIGS. 5A-5D illustrate different positions (or states) of the example battery lock out device of FIG. 2 according to an aspect of the disclosure.

Referring briefly to FIG. 5A and FIG. 1, the battery connector 106 may electrically connect the battery 134 to one or more components of the vehicle 102. The battery connector 106 may include a receiving connector 108*a* and/or a plug connector 108*b*. The receiving connector 108*a* may connect (or mate) with the plug connector 108*b* to establish an electrical connection between the battery 134 and the one or more components of the vehicle 102 and may disconnect from the plug connector 108*b* to terminate the electrical connection. The receiving connector 108*a* may include a power port 506 that houses high voltage terminals of the receiving connector 108*a*. In examples, the receiving connector 108*a* may further include a data plug (or data connector) 504 configured to enable communication between the vehicle 102 and the BMS of the battery 134. The receiving connector 108*a* may further include one or more tabs 502 configured to interface with the plug connector 108*b* when the receiving connector 108*a* and the plug connector 108*b* are connected. The receiving connector 108*a* may be coupled to the battery 134 and/or to wires 508 that are coupled to the battery 134. The plug connector 108*b* may be coupled to the one or more components of the vehicle 102 (e.g., a junction box) and/or to wires that are coupled to the one or more components of the vehicle 102. In examples, locations of the receiving connector 108*a* and the plug connector 108*b* may be reversed.

Figure 2:
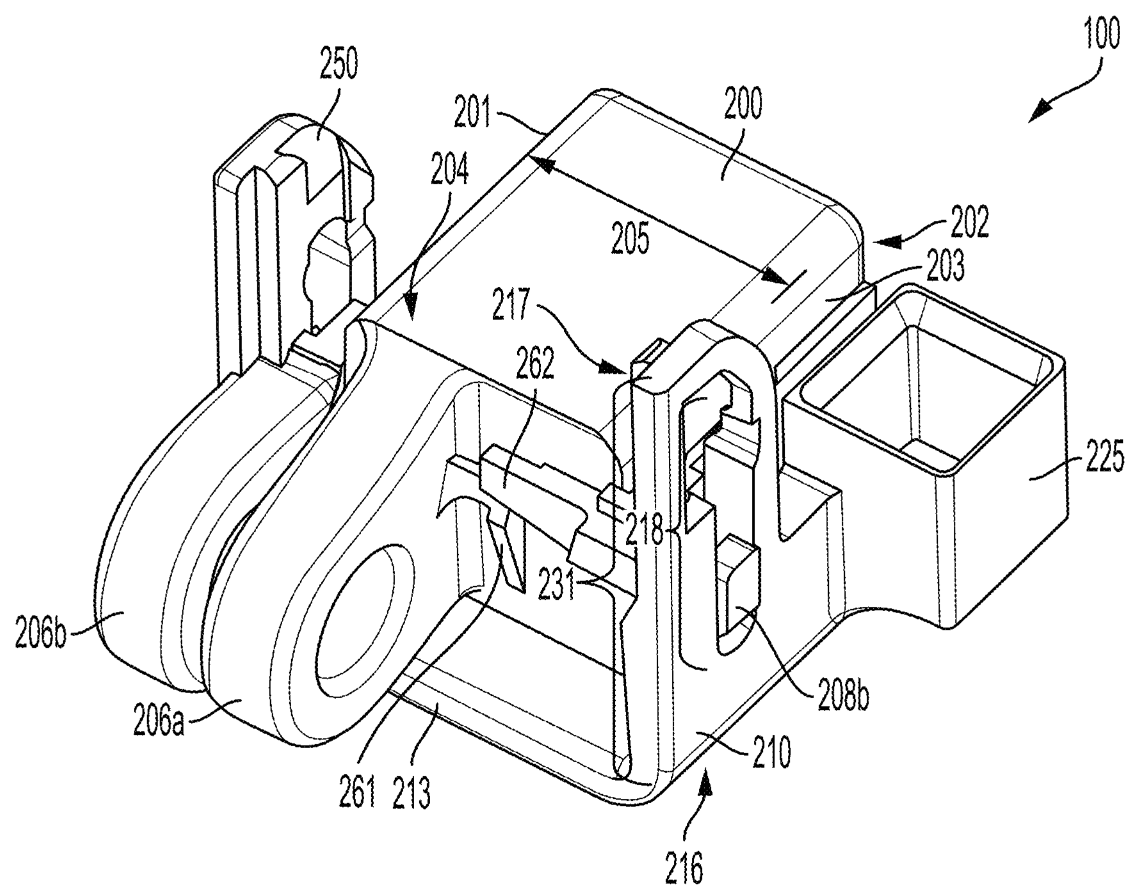
FIG. 2 is a perspective view of an example battery lock out device according to an aspect of the disclosure.
Figure 3:
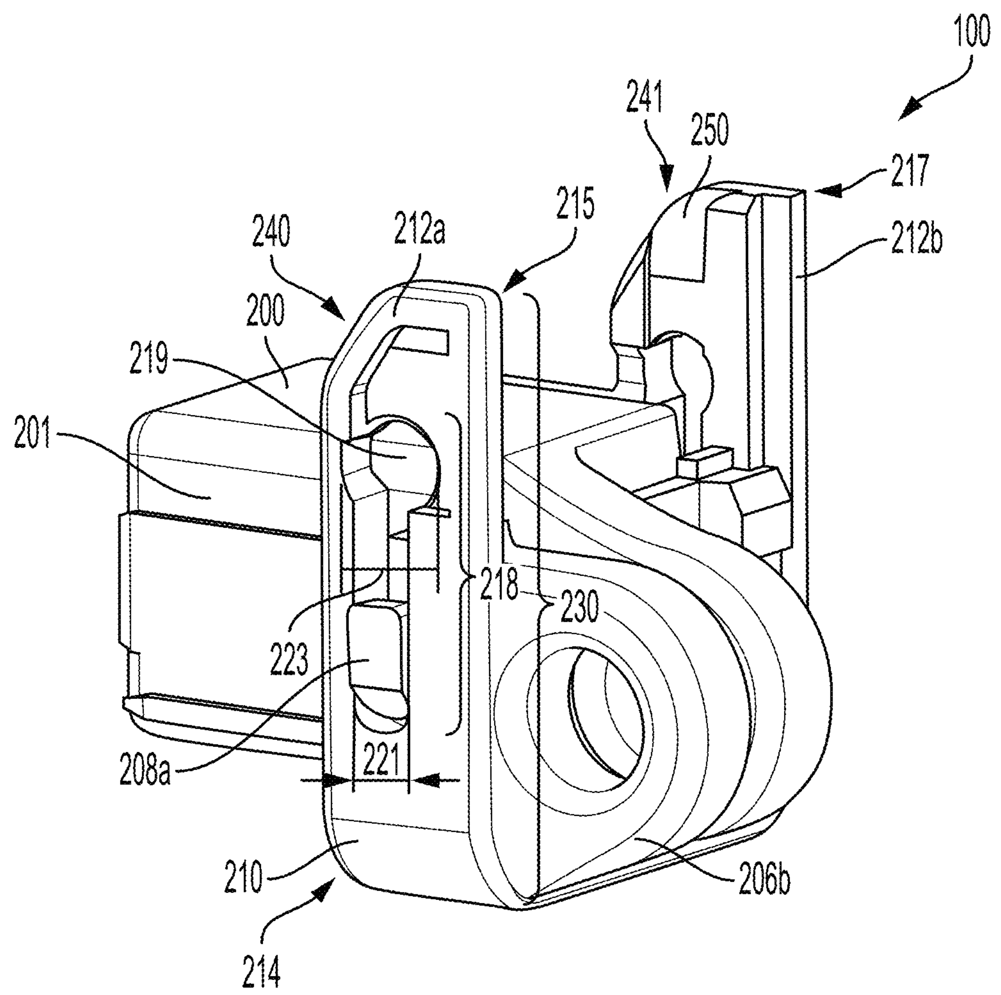
FIG. 3 is a perspective view of the example battery lock out device of FIG. 2 according to an aspect of the disclosure.
Figure 4:
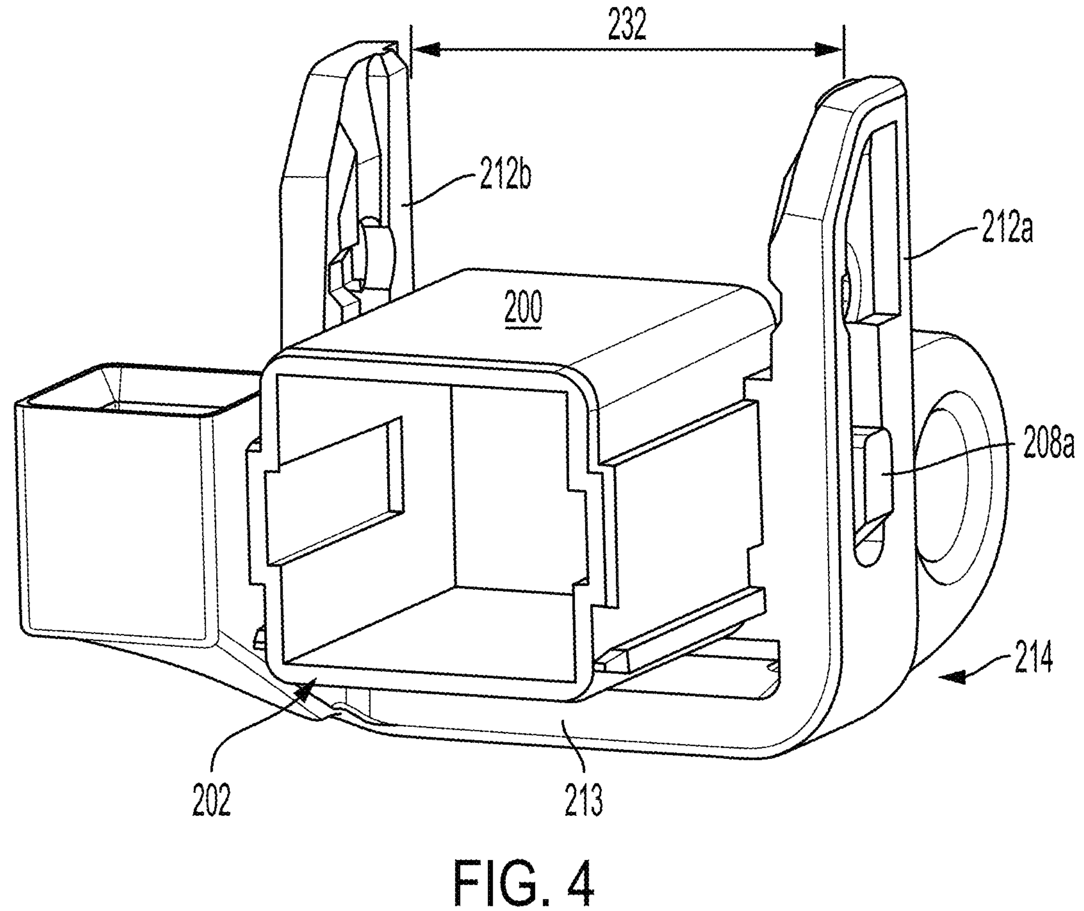
FIG. 4 is a perspective view of the example battery lock out device of FIG. 2 according to an aspect of the disclosure.

FIGS. 2-4 illustrate the example battery lock out device 100 of FIG. 1 from various perspective views. Some reference numerals are not shown in every figure of FIGS. 2-4 to better illustrate certain features of the example battery lock out device 100. With combined reference to FIGS. 2-4, the battery lock out device 100 may include a plug (or plug device) 200 and a sliding device 210 movably coupled to the plug 200. The plug 200 may include a plug end portion 202 and a lock end portion 204 opposite of the plug end portion 202 defining a length of the plug 200. The plug end portion 202 may be configured to plug (or slide) into a disconnected (i.e., not connected to the plug connector 108*b*) receiving connector 108*a* such that the high voltage terminals of the receiving connector 108*a* are covered. The lock end portion 204 may include a ring 206*a*. The lock end portion 204 and/or the ring 206*a* may be configured to receive a shackle of a lock. The plug 200 may further include a left side 201 and a right side 203 defining a width 205 of the plug 200.

The plug 200 may further include one or more side protrusions, including a left side protrusion 208*a* coupled to the left side 201 of the plug 200 and a right side protrusion 208*b* coupled to the right side 203 of the plug 200. The left side protrusion 208*a* may be opposite of the right side protrusion 208*b* defining the width 205 of the plug 200. The one or more side protrusions 208*a* and 208*b* may each slide within one or more channels 218 of the sliding device 210 and may movably couple the sliding device 210 to the plug 200. In examples, the left side protrusion 208*a* and the right side protrusion 208*b* may be positioned along an axis perpendicular to the length of the plug 200.

Figure 5B:
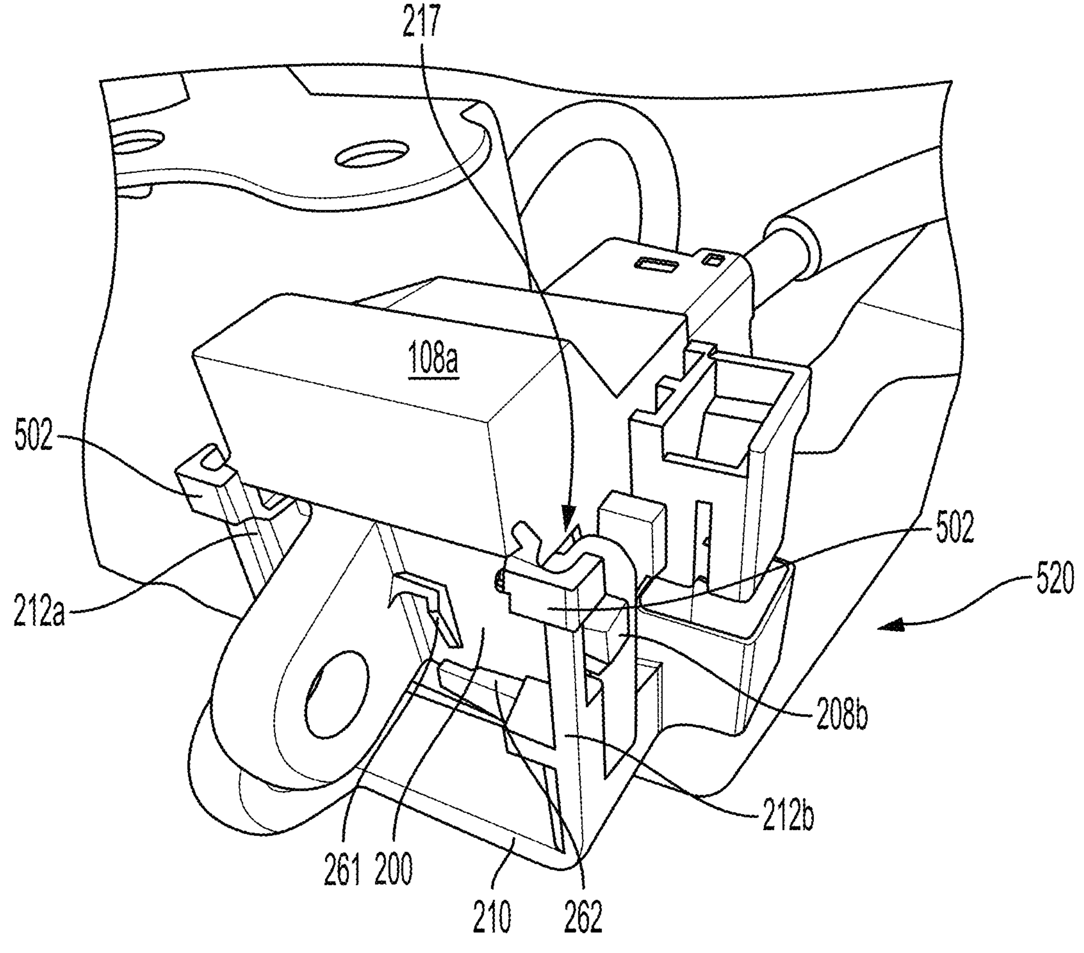
Figure 5C:
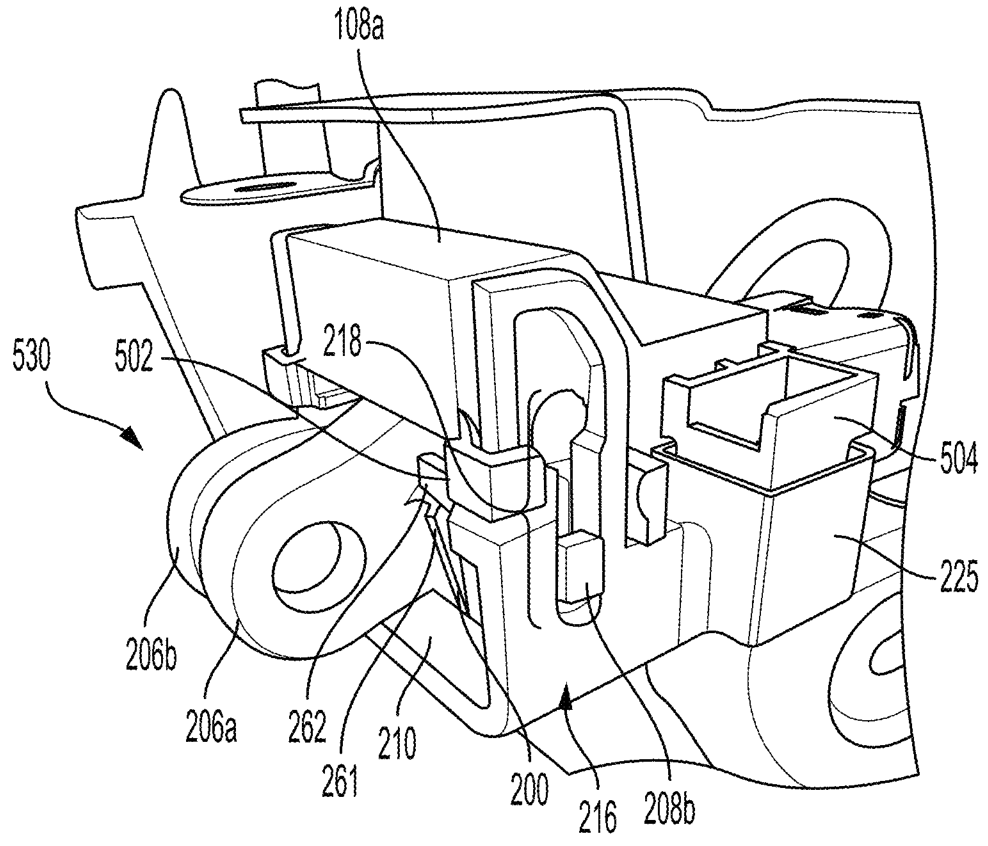
Figure 5D:
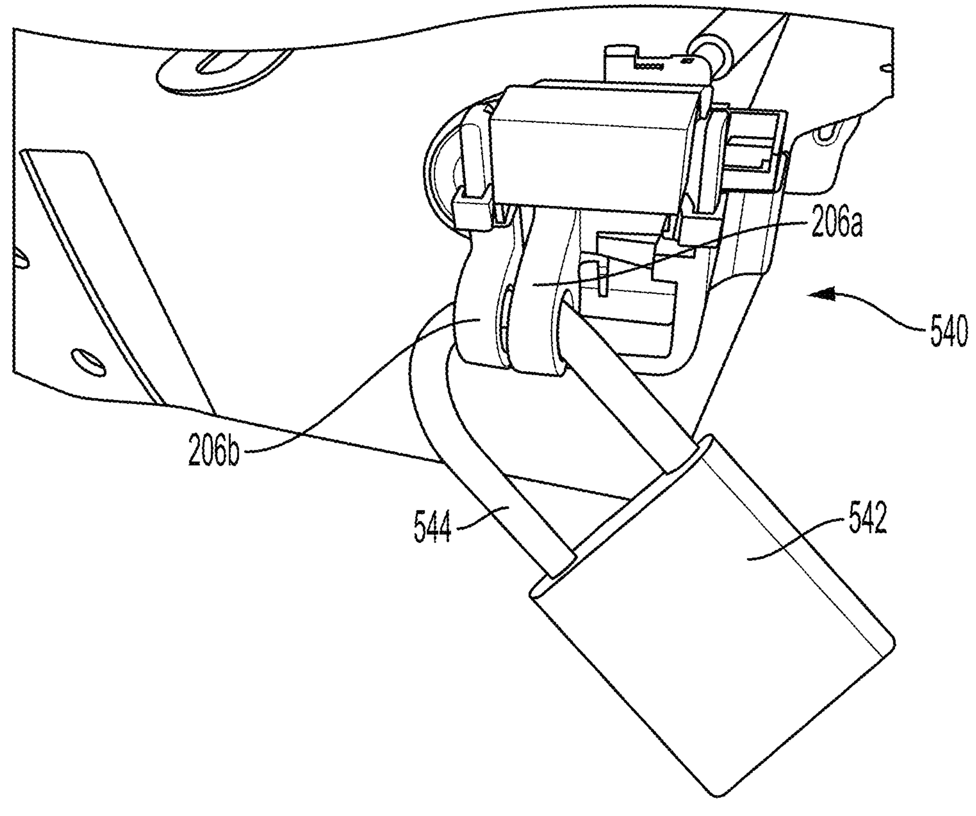

The sliding device 210 may be substantially U-shaped and may include a connecting portion (or connecting bridge) 213 coupled to one or more legs of the sliding device 210, including a left leg 212*a* and/or a right leg 212*b*. The one or more legs 212*a* and 212*b* may each be configured to contact and/or slide within the one or more tabs 502 of the receiving connector 108*a* (as shown by FIGS. 5B-5D). The left leg 212*a* may include a proximal (or first) end portion 214 and a distal (or second) end portion 215 opposite of the proximal end portion 214 defining a length 230 of the left leg 212*a*. The distal end portion 215 of the left leg 212*a* may have a sloped (or cutout) portion 240 to facilitate rotation of the sliding device 210 around the plug 200 when the plug 200 is mated with the receiving connector 108*a* (as shown by FIGS. 5A-5B). The right leg 212*b* may include a proximal (or first) end portion 216 and a distal (or second) end portion 217 opposite of the proximal end portion 216 defining a length 231 of the right leg 212*b*. The distal end portion 217 of the right leg 212*b* may have a sloped (or cutaway) portion 241.

The connecting portion 213 may be coupled to the proximal end portion 214 of the left leg 212*a* and the proximal end portion 216 of the right leg 212*b* such that the connecting portion 213 may be located substantially between the left leg 212*a* and the right leg 212*b* and may separate the left leg 212*a* and the right leg 212*b* by a length 232 (as shown in FIG. 4). The length 232 of the connecting portion 213 may be substantially perpendicular to the length 230 of the left leg 212*a* and the length 231 of the right leg 212*b*. The length 232 of the connecting portion 213 may be equal to or greater than the width 205 of the plug 200 to enable the plug 200 to be located between the left leg 212*a* and the right leg 212*b*.

As previously discussed, the one or more side protrusions 208*a* and 208*b* of the plug 200 may each slide within one or more channels 218 of the sliding device 210. The one or more channels 218 may each have a narrow portion having a width 221. In examples, the one or more channels 218 may include one or more enlarged channel portions 219 each having a width 223 that is greater than the width 221 of the narrow portion. The one or more enlarged channel portions 219 may be configured to enable the one or more side protrusions 208*a* and 208*b* to rotate within the enlarged channel portions 219 such that the sliding device 210 may rotate around the plug 200. In examples, the sliding device 210 may rotate about an axis perpendicular to the length of the plug 200 and to slide in a direction perpendicular to the length of the plug 200 to prevent the plug 200 from being removed from the receiving connector 108*a*. In examples, the one or more enlarged channel portions 219 may be substantially circular to enable the one or more side protrusions 208*a* and 208*b* to rotate within the enlarged channel portions 219. In examples, the sliding device 210 may not rotate around the plug 200 when the one or more side protrusions 208*a* and 208*b* are within the narrow portion of each channel of the one or more channels 218.

To movably couple the plug 200 to the sliding device 210 to form the battery lock out device 100, the one or more side protrusions 208*a* and 208*b* may slide within sloped portions 250 of the sliding device 210 thereby guiding the one or more side protrusions 208*a* and 208*b* into the one or more channels 218. For example, to movably couple the plug 200 to the sliding device 210, the plug 200 may be placed between the left leg 212*a* and the right leg 212*b* of the sliding device 210 such that the one or more side protrusions 208*a* and 208*b* may slide into the sloped portions 250 of the sliding device 210. The plug 200 may then be manipulated such that the one or more side protrusions 208*a* and 208*b* extend into and/or through the one or more enlarged channel portions 219.

The sliding device 210 may further include a ring 206*b* coupled to the left leg 212*a*, the right leg 212*b*, and/or the connecting portion 213 and configured to receive the shackle of the lock. The ring 206*b* of the sliding device 210 may be located and/or configured to align and/or be adjacent to the ring 206*a* of the plug 200 such that the shackle of the lock may be placed through both the rings 206*a* and 206*b*.

The sliding device 210 may further include a data (or other) connector cover 225 coupled to the left leg 212*a*, the right leg 212*b*, and/or the connecting portion 213 and configured to receive the data plug 504 of the receiving connector 108*a* and to cover and/or protect the data plug 504 (as shown by FIG. 5C).

FIGS. 5A-5D illustrate different positions (or states) of the battery lock out device 100 when locking out the receiving connector 108*a*. With combined reference to FIGS. 1-4 and 5A-5D, a first position (or an open unlocked state) 510 of the battery lock out device 100 may include the sliding device 210 being positioned such that the connecting portion 213 is adjacent with the ring 206*a* of the plug 200. The first position 510 enables the distal end portions 215 and 217 of the one or more legs 212*a* and 212*b* to pass under the one or more tabs 502 of the receiving connector 108*a* to mate (or engage) the plug 200 with the power port 506 of the receiving connector 108*a* (as shown by FIG. 5A).

A second position (or a partially closed unlocked state) 520 of the battery lock out device 100 may include the sliding device 210 being positioned such that the distal end portions 215 and 217 of the one or more legs 212*a* and 212*b* are in contact with the one or more tabs 502 of the receiving connector 108*a* (as shown by FIG. 5B).

A third position (or a closed unlocked state) 530 of the battery lock out device 100 may include the sliding device 210 being positioned such that the one or more side protrusions 208*a* and 208*b* are adjacent to the proximal end portions 214 and 216 of the one or more legs 212*a* and 212*b*, respectively (as shown by FIG. 5C). In examples, the third position 530 may further include the data connector cover 225 of the sliding device 210 being mated with the data plug connector 504 of the receiving connector 108*a*. In examples, the third position 530 may further include a retainer (or flexing arm) 262 coupled to the left leg 212*a* and/or the right leg 212*b* of the sliding device 210 interfacing with a retainer ramp 261 coupled to the lock end portion 204 of the plug 200 such that the sliding device 210 is retained in the third position 530 (e.g., through friction and/or tension between the retainer 262 and the retainer ramp 261) and does not slide down into the second position 520 due to gravity.

A fourth position (or a closed locked state) 540 of the battery lock out device 100 may include a shackle 544 of a lock 542 placed through the rings 206*a* and 206*b* such that the battery lock out device 100 and the lock 542 is locked (as shown by FIG. 5D). Once the battery lock out device 100 is in the fourth position 540, the lock 542 must be unlocked and the shackle 544 removed from the rings 206*a* and 206*b* before the battery lock out device 100 may return to previous positions 510, 520, and 530 and/or removed from the receiving connector 108*a*.

Figure 6:
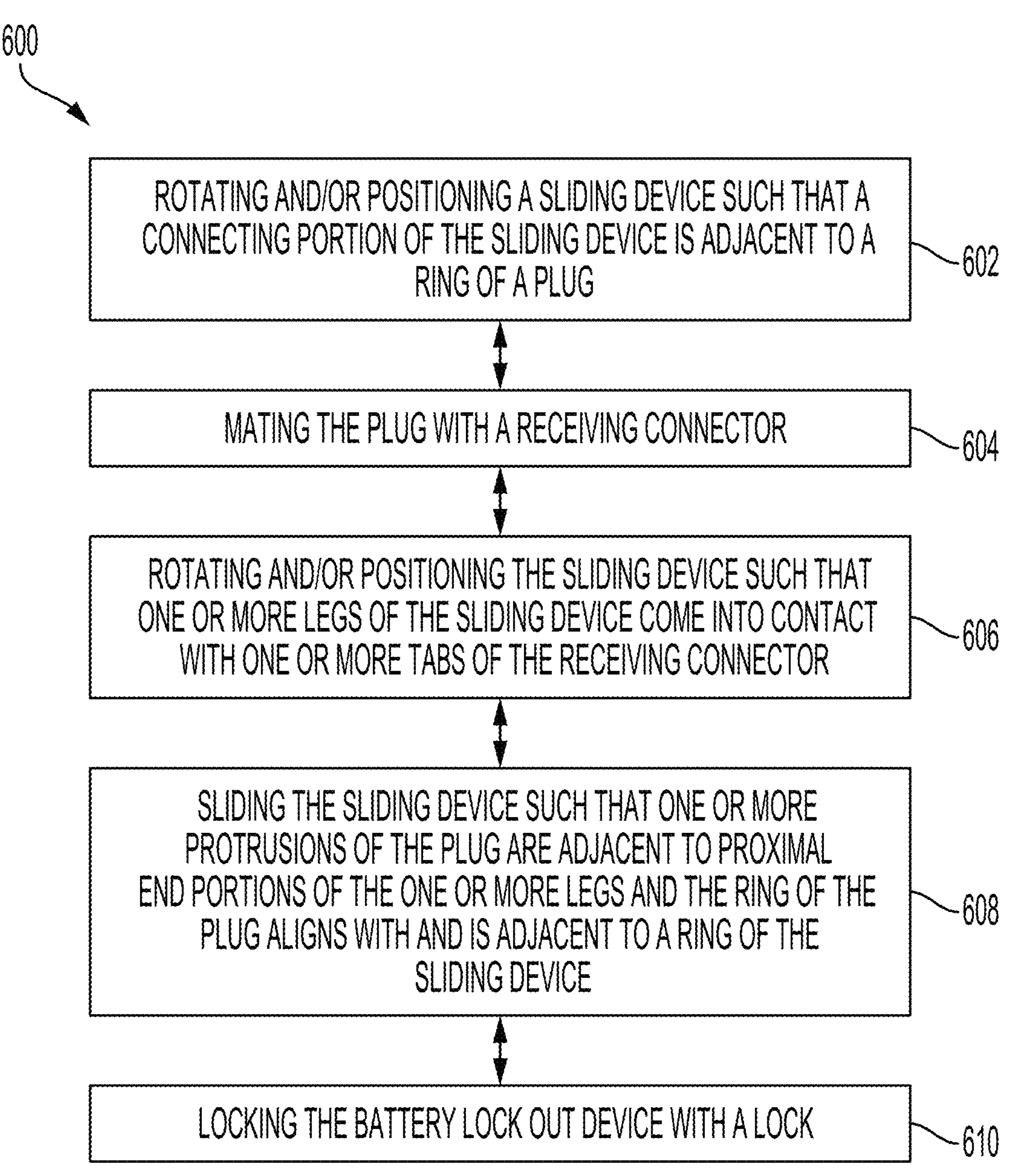
FIG. 6 is a flow diagram of an example method for locking a connector of a battery using the example battery lock out device of FIG. 2 according to an aspect of the disclosure.

FIG. 6 is a flow diagram of an example method 600 for locking out a receiving connector of a battery and/or a vehicle. A user and/or an appropriately programmed machine (e.g., an industrial robotic arm) may implement method 600. For ease of description, the process 600 is described below with reference to FIGS. 1-4 and 5A-5D. The process 600 of the present disclosure, however, is not limited to use of the exemplary battery lock out device 100 of FIGS. 1-4 and 5A-5D.

The method 600 may include rotating and/or positioning the sliding device 210 such that the connecting portion 213 is adjacent to the ring 206*a* of the plug 200 (602). The sliding device 210 may be rotated around the plug 200 such that the battery lock out device 100 is in the first position 510 (i.e., the connecting portion 213 is adjacent to the ring 206*a* of the plug 200).

The method 600 may further include mating the plug 200 with the receiving connector 108*a* (604). While in the first position 510, the plug 200 may be inserted into the power port 506 of the receiving connector 108*a* such that the plug 200 is mated with the receiving connector 108*a*.

The method 600 may further include rotating (e.g., by about 90 degrees) the sliding device 210 such that the one or more legs 212*a* and 212*b* of the sliding device 210 come into contact with the one or more tabs 502 of the receiving connector 108*a* (606). The sliding device 210 may be rotated down such that the battery lock out device 100 is in the second position 520 (i.e., the one or more legs 212*a* and 212*b* of the sliding device 210 are in contact with the one or more tabs 502 of the receiving connector 108*a*).

The method 600 may further include sliding the sliding device 210 up such that the one or more protrusions 208*a* and 208*b* are adjacent to the proximal end portions 214 and 216 of the one or more legs 212*a* and 212*b* and the ring 206*a* of the plug 200 aligns with and is adjacent to the ring 206*b* of the sliding device 210 (608). The sliding device 210 may be slid up such that the battery lock out device 100 is in the third position 530 (i.e., the one or more protrusions 208*a* and 208*b* are adjacent to the proximal end portions 214 and 216 of the one or more legs 212*a* and 212*b*). In examples, the sliding device 210 may be configured to slide in a direction perpendicular to the length of the plug to align the first ring 206*a* and the second ring 206*b* such that the first ring 206*a* and the second ring 206*b* may receive the lock shackle 544 to lock a position of the sliding device 210 relative to the plug 200 to prevent the plug 200 from being removed from the receiving connector 108*a*.

The method 600 may further include locking the battery lock out device 100 with the lock 542 (610). The shackle 544 of the lock 542 may be placed through the rings 206*a* and 206*b* of the plug 200 and the sliding device 210 and the lock 542 and the battery lock out device 100 may be locked such that the receiving connector 108*a* may not be mated with any other connector without first unlocking the lock 542 and removing the battery lock out device 100 from the receiving connector 108*a*.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A lock out device for locking a battery connector comprising:

a plug having:

a plug end configured to engage the battery connector to prevent another connector from being connected to the battery connector, and a lock end opposite of the plug end defining a length of the plug, the lock end having a first ring configured to receive a lock shackle; and a sliding device movably coupled to the plug and having a second ring configured to receive the lock shackle, the sliding device being configured to rotate about an axis perpendicular to the length of the plug and to slide in a direction perpendicular to the length of the plug to prevent the plug from being removed from the battery connector.

2. The lock out device of claim 1, wherein the sliding device is further configured to slide in the direction perpendicular to the length of the plug to align the first ring and the second ring such that the first ring and the second ring may receive the lock shackle to lock a position of the sliding device relative to the plug to prevent the plug from being removed from the battery connector.

3. The lock out device of claim 1, wherein the plug further includes one or more protrusions along the axis perpendicular to the length of the plug, the one or more protrusions being configured to movably couple the plug to the sliding device.

4. The lock out device of claim 3, wherein:

the plug further includes a retainer ramp, and the sliding device further includes:

one or more legs each having a channel configured to receive a protrusion of the one or more protrusions, and a retainer coupled to a leg of the one or more legs and configured to engage the retainer ramp.

5. The lock out device of claim 3, wherein the sliding device further includes one or more legs each having:

a distal end and a proximal end opposite of the distal end, and a channel configured to receive a protrusion of the one or more protrusions.

6. The lock out device of claim 5, wherein the sliding device may rotate about the axis perpendicular to the length of the plug when at least one protrusion of the one or more protrusions is adjacent to the distal end of at least one leg of the one or more legs.

7. The lock out device of claim 6, wherein the first ring and the second ring will align if the sliding device is positioned such that at least one protrusion of the one or more protrusions is adjacent to the proximal end of at least one leg of the one or more legs.

8. The lock out device of claim 4, wherein:

each channel of the one or more legs includes a narrow portion having a first width and an enlarged portion having a second width that is larger than the first width, and the sliding device may rotate about the axis perpendicular to the length of the plug when the one or more protrusions are within the enlarged portion of at least one leg of the one or more legs.

9. The lock out device of claim 1, wherein the sliding device further includes one or more legs configured to engage one or more tabs of the battery connector.

10. The lock out device of claim 9, wherein the sliding device further includes a data connector cover coupled to at least one leg of the one or more legs and configured to receive a data plug of the battery connector.

11. A lock out device for locking a connector of a vehicle battery comprising:

a plug configured to engage the connector of the vehicle battery to prevent another connector from being connected to the connector of the vehicle battery and having:

a first ring configured to receive a shackle of a lock, a left side protrusion, and a right side protrusion opposite of the left side protrusion defining a width of the plug; and a sliding device movably coupled to the plug and having a second ring configured to receive the shackle, the sliding device being configured to rotate about the left side protrusion and the right side protrusion and to slide toward the plug to align the first ring and the second ring such that the first ring and the second ring may receive the shackle to prevent the plug from being removed from the connector of the vehicle battery.

12. The lock out device of claim 11, wherein the sliding device further includes one or more legs each having:

a distal end and a proximal end opposite of the distal end, and a channel configured to receive the left side protrusion or the right side protrusion.

13. The lock out device of claim 11, wherein:

the plug further includes a retainer ramp, and the sliding device further includes:

one or more legs each having a channel configured to receive the left side protrusion or the right side protrusion, and a retainer coupled to a leg of the one or more legs and configured to engage the retainer ramp to retain a position of the sliding device relative to the plug.

14. The lock out device of claim 13, wherein the one or more legs are configured to engage one or more tabs of the connector of the vehicle battery.

15. The lock out device of claim 13, wherein:

each channel of the one or more legs includes a narrow portion having a first width and an enlarged portion having a second width that is larger than the first width, and the sliding device may rotate about the left side protrusion and the right side protrusion when the left side protrusion or the right side protrusion is positioned within the enlarged portion of the channel of at least one leg of the one or more legs.

16. The lock out device of claim 13, wherein the sliding device is prevented from rotating about the left side protrusion and the right side protrusion when the left side protrusion or the right side protrusion is positioned within the narrow portion of the channel of the at least one leg.

17. The lock out device of claim 13, wherein the first ring and the second ring will align if the sliding device is positioned such that the left side protrusion or the right side protrusion is adjacent to the proximal end of at least one leg of the one or more legs.

18. The lock out device of claim 13, wherein the second ring is coupled to at least one leg of the one or more legs.

19. The lock out device of claim 13, wherein at least one leg of the one or more legs has a cutout portion at the distal end of the at least one leg.

20. The lock out device of claim 13, wherein the sliding device further includes a data connector cover coupled to at least one leg of the one or more legs and configured to receive a data plug of the connector of the vehicle battery.

* * * * *